F. RUDOLPHI.
CAN BODY MAKING MACHINE.
APPLICATION FILED SEPT. 13, 1909.
1,082,557.
Patented Dec. 30, 1913.
5 SHEETS—SHEET 2.
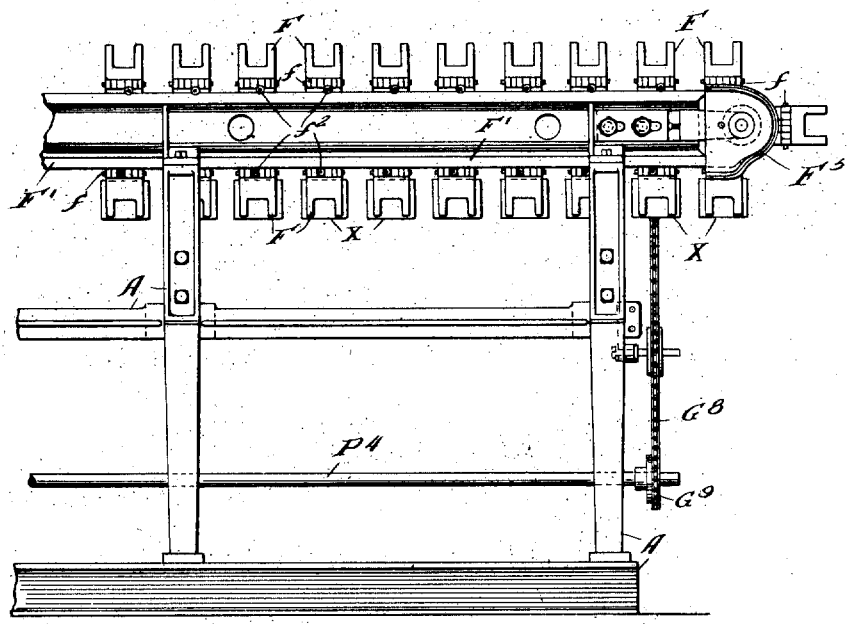
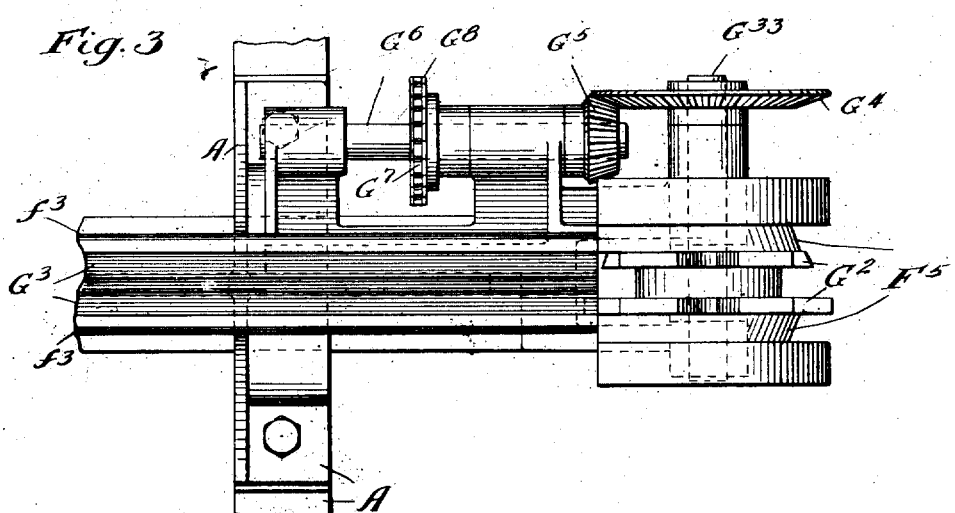

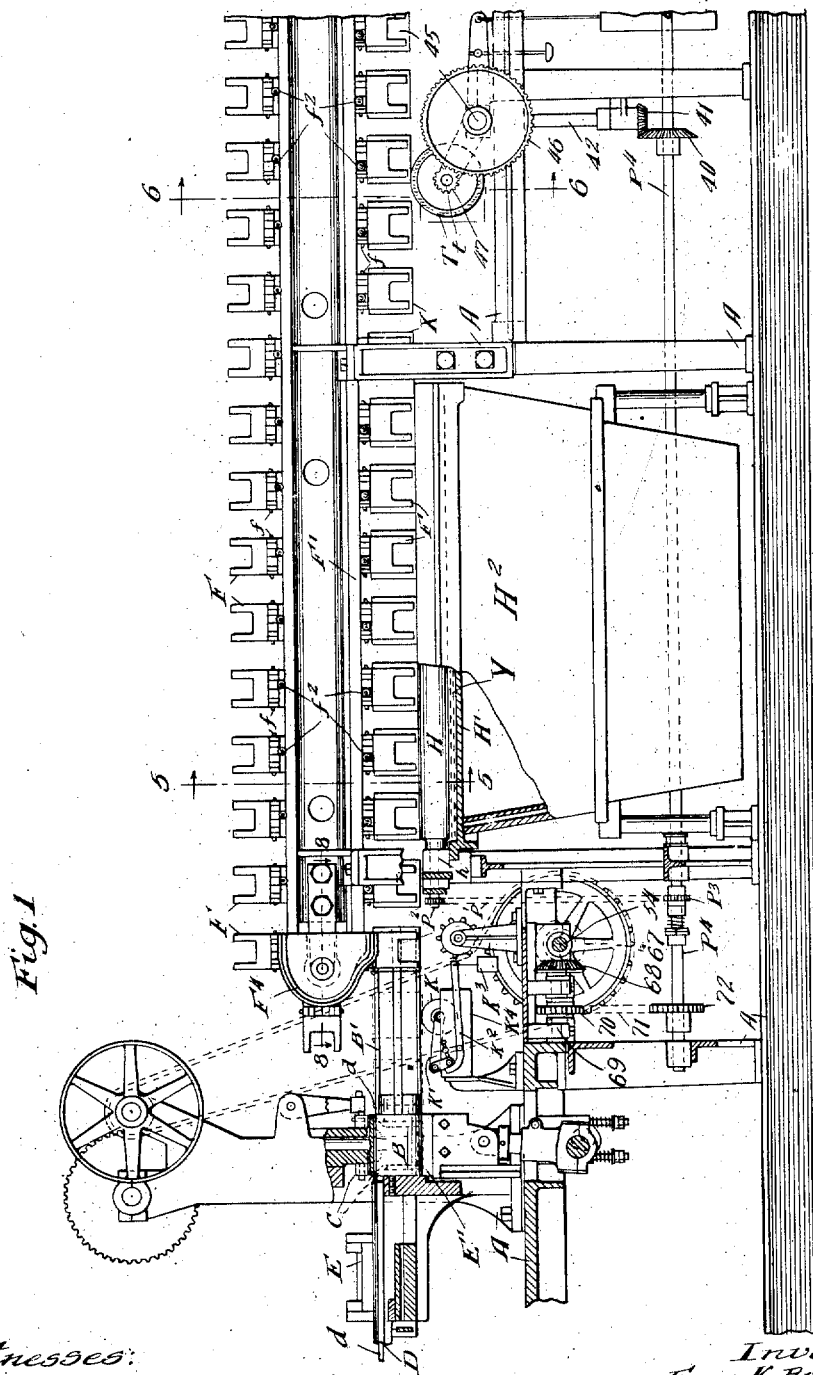

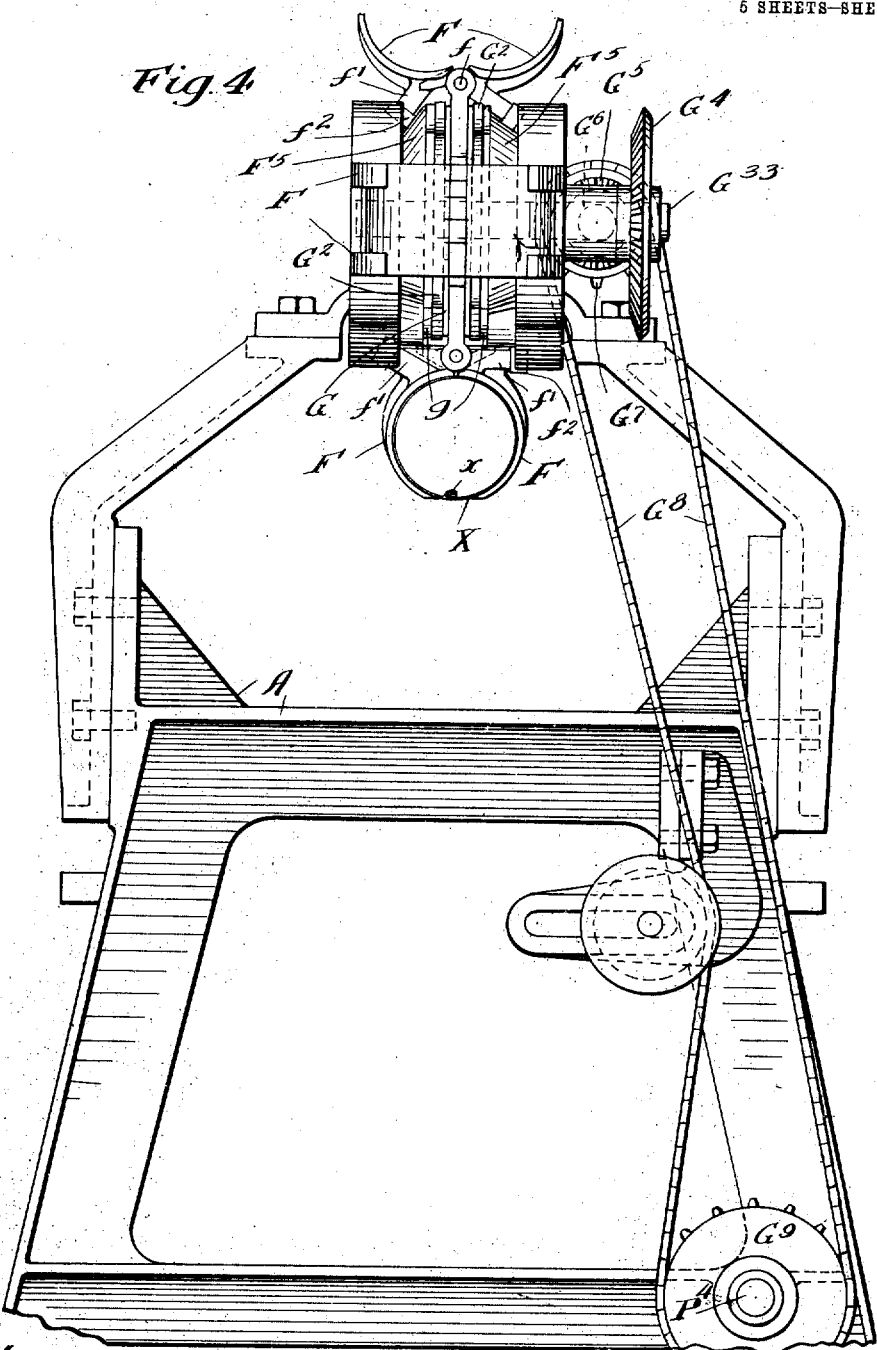

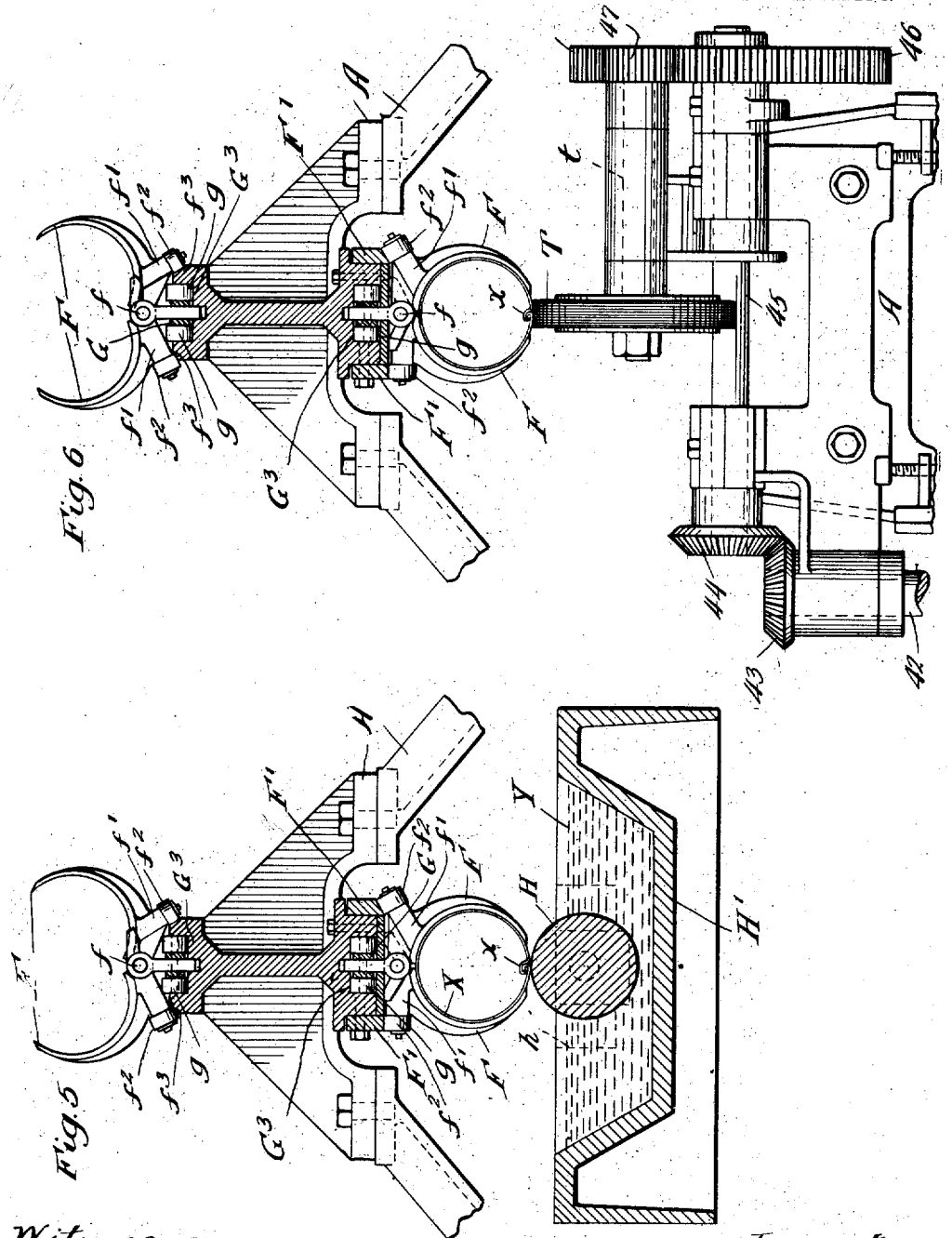

F. RUDOLPHI.
CAN BODY MAKING MACHINE.
APPLICATION FILED SEPT. 13, 1909.
1,082,557.
Patented Dec. 30, 1913.
5 SHEETS—SHEET 5.
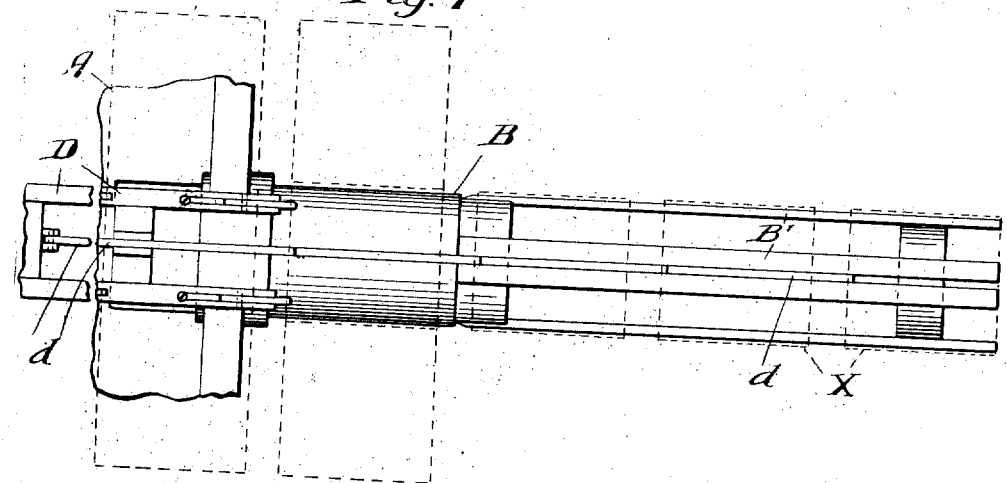
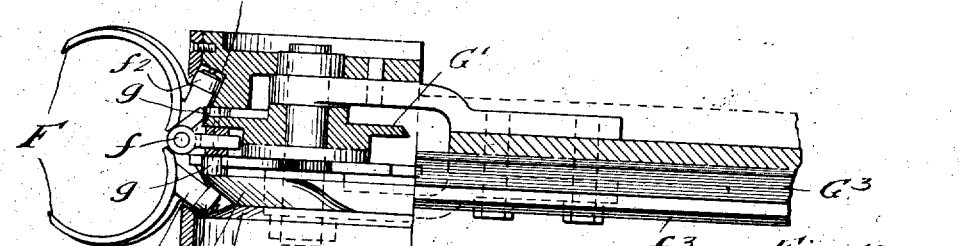
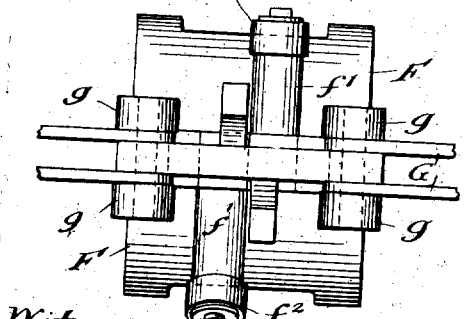
Witnesses
Wm. Geiger
H. W. Munday
Inventor
Frank Rudolphi
By Munday, Evarts, Adcock & Clarke
Attorneys

UNITED STATES PATENT OFFICE.

FRANK RUDOLPHI, OF CHICAGO, ILLINOIS, ASSIGNOR TO AMERICAN CAN COMPANY, OF NEW YORK, N. Y., A CORPORATION OF NEW JERSEY.

CAN-BODY-MAKING MACHINE.

1,082,557.  Specification of Letters Patent.  Patented Dec. 30, 1913.

Application filed September 13, 1909.  Serial No. 517,362.

*To all whom it may concern:*

Be it known that I, FRANK RUDOLPHI, a citizen of the United States, residing in Chicago, in the county of Cook and State of Illinois, have invented a new and useful Improvement in Can-Body-Making Machines, of which the following is a specification.

My invention relates to improvements in can body making machines, and more particularly to the part or mechanism of such machines which solders the side seam of the can body after it is formed up from the flat blank.

In can body making machines heretofore generally in use, after the flat blank has been formed up into a can body of cylindrical or other shape, it is ordinarily pushed forward off of the can body former horn onto a soldering horn, the inner end of which is connected directly to the end body of the former horn, the soldering horn serving to support and guide the can bodies in coöperative relation with the flux applying, solder applying and solder sweating devices as they are pushed along said horn by an endless conveyer chain or other conveyer device. And while the expansible body former horn around which the can body blank is formed into a can body serves to size the can body from the interior so that the can bodies are produced of approximately uniform interior diameter, the can bodies necessarily fit loosely on the soldering horn, which is usually of skeleton form, and during the operation of soldering the side seam, the can bodies are neither internally nor externally sized nor shaped, or held and maintained of the precise shape, size and diameter necessary to cause them to always uniformly and tightly fit within the flanges of the can heads, although in the practical manufacture of sheet metal cans, it is of the greatest importance that the can bodies should fit with extreme accuracy and tightness within the flanges of the can heads in order to insure perfect and hermetically tight soldered joints and with a minimum amount of solder. And, moreover, the soldering horn which fits inside the can bodies, and along which the can bodies are slipped during the soldering operation also tends to mar, injure or scrape off the lacquer or other protective coating which may be applied to the sheets or blanks from which the can bodies are formed. And in the machines heretofore in use, as the can bodies necessarily fit loosely on the soldering horn in order to enable them to be slipped or pushed along it, if it is attempted to apply the solder to the lock side seam of the can body by means of a longitudinally arranged roller revolving in molten solder in order to more effectually apply the solder to the seam and sweat it therein and economize the amount of solder required, great difficulty is experienced in practical operation in preventing the can bodies, or some of them, turning slightly on the soldering horn under the action of the transversely rotating solder applying roller, and thus causing the side seam of the can body to improperly register and contact with the solder applying roller.

The object of my invention is to provide a can body making machine in which the can bodies may be sized from the inside during the body forming operation as heretofore, and also sized from the exterior during the side seam soldering operation, thus insuring the production of can bodies of uniform exterior diameter or size, so as to properly, snugly and tightly fit within the flanges of the can heads as required, and in which also the soldering of the side seam of the can body may be performed without in any way marring either the interior or exterior surface of the can body, or any lacquer or protective or decorative coating applied either to the interior or exterior surface thereof, and in which also each and every can body will be accurately presented and firmly held with its side seam in proper coöperative registration and contact with the solder applying roller or other solder applying or sweating device.

My invention consists in the means I employ to practically accomplish the above object or result. That is to say, it consists in a can body making machine comprising in coöperative combination, an expansible, or internal sizing, body former horn, a solder applying and sweating device, preferably a longitudinally arranged roller revolving in a molten solder vessel, and a can body carrier, preferably an endless flexible carrier or chain, furnished with a series of opening and closing, external, sizing can body holders or clamps to which the can bodies are delivered directly from the body former horn, and by which the can bodies are conveyed and held and maintained externally sized and shaped while being operated upon by the solder applying and sweating device, and the side seam of each can body accurately presented to such solder applying and sweating device. As each can body is thus externally gripped in a traveling can body holder or clamp by which it is conveyed with its side seam in contact with the solder applying roller, the rotating solder applying roller may rub firmly against the side seam of the can and thus effectually sweat the solder into the seam and effect the soldering with a minimum amount of solder without producing any tendency for the can body to axially turn or get its side seam out of register with the soldering or sweating device. And as the can body during the soldering operation has no sliding movement along any horn, the lacquer or other coating on the inside of the can body cannot be injured, broken or disturbed, and as the can body is externally clamped, firmly compressed, shaped and sized during the soldering operation, there is no possibility of any movement of one member of the seam in respect to the other and consequent defective soldering, and the finished can bodies are thus also for the same reason uniformly produced of the same external diameter or size, so that they will each and all properly and very tightly fit the flanges of the die-made can heads. The external sizing can body holders or clamps are preferably held closed by stationary tracks or rails with which the operating arms of the clamps engage as they are conveyed along by the carrier upon which they are mounted. Stationary cams are also preferably employed for opening and closing the external sizing can body holders or clamps. The can body former horn is furnished with a short extension for supporting each can body in turn in position to be grasped by the can body holders or clamps of the soldering mechanism.

My invention also consists in the novel construction of parts and devices and in the novel combinations of parts and devices herein shown and described.

The body forming mechanism of my can body making machine may be of any suitable kind or construction known to those skilled in the art. It should, however, have an expansible or internally sizing can body former horn so that the can bodies will be sized from the inside and thus brought to approximate uniform size or diameter internally at the time the hooks or edge folds of the lock seam are bumped or compressed together. The body former mechanism which I prefer to use is preferably constructed substantially in accordance with the specification and drawings of my Patent No. 956,180.

In the accompanying drawing forming a part of this specification, I have only shown that portion of the body former mechanism which is directly connected or related to my present improvement, as the other portions of said body forming mechanism are not necessary for a full understanding and explanation of my invention.

In said drawing, Figures 1 and 2 taken together are a side elevation, partly in vertical section, of a can body forming machine embodying my invention, the front portion of the body forming mechanism being broken away or omitted, as my invention has no particular relation thereto. Fig. 3 is a detail plan view of the portion of the machine shown in Fig. 2. Fig. 4 is a rear end elevation. Fig. 5 is a vertical cross section on line 5—5 of Fig. 1. Fig. 6 is a vertical cross section on line 6—6 of Fig. 1. Fig. 7 is a detail plan view showing the body blank carrier or feed device, the body former horn and certain connecting parts. Fig. 8 is a detail, partial, horizontal section on line 8—8 of Fig. 1, showing certain parts in plan. Fig. 9 is a detail plan view of one of the can body clamps or holders on the can body carrier. Fig. 10 is a detail elevation of one of said can body clamps or holders.

In said drawing, A represents the frame, B the internal, sizing or expansible body former horn, C C body formers for wrapping the flat blank around said horn, D a reciprocating body blank conveyer for conveying the body blanks first to the hook-formers or edge folding devices E E, and then to the body former horn B and body formers C and bumper or seam squeezer E¹, said body blank conveyer being also provided with can body ejectors or fingers $d$ for pushing the formed can body off of the body former B onto the short extension B¹ thereof, which supports each can body in position to be grasped by the external, sizing can body clamps or holders F of the side seam soldering mechanism.

In actual practice it is found that the hooked parts forming the lock seam are not always sufficiently and uniformly swaged together so as to prevent relative movement thereof either of the entire hooked parts or portions of the same, during the subsequent handling of the formed body, and when this happens the body naturally expands and in machines using a horn for supporting the bodies during the soldering and sweating operations and ordinary chain pushers, there is nothing to restore the bodies to their original or correct size, and the horn tends to increase the size. By using an expanding, sizing body former horn on the interior of the can body, I provide bodies which cannot be too small, and if the seams are properly bumped, are of permanent and correct size, and by using and subsequently operating external sizing clamps which hold the bodies to a uniform size until the solder is set, I provide means whereby can bodies, if too large when presented to the clamps, are restored to their proper size.

The body former horn B, body formers C, blank conveyer D, can body ejector $d$, hook formers E and bumper $E^1$ may be of any suitable kind or construction, but are preferably constructed substantially in accordance with the specification and drawings of my said patent above mentioned. Reference is made to the patent for a more full description of said parts.

The externally sizing can body holders or clamps F each comprise a pair of hinged, segmental clamp members, hinged together at $f$ and adapted to externally grasp, compress, shape, and size the can body, each pair of clamps leaving only a small segment of the can body X adjacent to the lock side seam $x$ thereof exposed for contacting with the solder applying and sweating roller H. The opening and closing external can body clamps F are preferably mounted on an endless flexible can body carrier G, preferably a link chain, with the clamps F preferably on each alternate link of the chain carrier. The endless carrier G is preferably mounted on upright pulleys or sprocket wheels $G^1$ $G^2$. The endless flexible carrier or chain G is guided and supported between the pulleys or wheels $G^1$ $G^2$ by tracks or rails $G^3$, the carrier having anti-friction rollers or wheels $g$ to travel upon said rails. Each hinged member of the can body holder or clamp F is provided with an operating arm $f^1$, preferably furnished with an anti-friction roller $f^2$ which engages a track or rail $F^1$ for holding the clamp member in its closed position, and with tracks or rails $f^3$ against which said arms ride when the clamp members are open, and stationary cams $F^4$ are provided, which engage with the operating arms of said cam members to close the same upon the can body, and further stationary cams $F^5$ are provided to automatically open the can body holder or clamp to discharge the soldered can body from the machine.

The solder applying roller H is longitudinally arranged with its axis parallel to the can body carrier G and directly below the lower loop of the endless flexible carrier. The solder applying roller H is preferably immersed for the major portion of its diameter in the molten solder Y in the solder pot or vessel $H^1$. Said solder applying roller is preferably a smooth, cylindrical roller of uniform diameter from end to end. It is journaled in suitable bearings $h$ on the frame of the machine and is continuously rotated. The solder in the pot or vessel $H^1$ is kept in a molten condition by a suitable furnace or heater $H^2$.

K is a flux applying roller mounted directly beneath the extension $B^1$ of the body former horn B. It is mounted on the arm $K^1$ of an adjustable lever $K^2$, having a weight $K^3$ for holding the roller in contact with the side seam of the can body as the can body is pushed along the horn extension $B^1$ of the body former horn B by the can body ejector $d$ of the body forming mechanism. The flux applying roller K is partially immersed in the liquid flux contained in the flux trough or vessel $K^4$. The flux applying roller is rotated by frictional contact with the can body as a can body is pushed along its support $B^1$.

The can body ejector $d$, as it discharges the formed can body from the body former horn B, operates to push the can body into position on the horn extension $B^1$ directly under the cam $F^4$ which operates to close the externally sizing can body holders or clamps F, so that as said holders or clamps close, they firmly grip the can body and externally clamp or size it and hold it with great firmness so that the can body cannot turn in the clamp or holder F when its side seam is presented to the rotating solder applying and sweating roller H. The can body conveyer D and can body ejector $d$ thereon may be reciprocated by any suitable mechanism, preferably by that shown and described in my said pending application.

The endless flexible can body carrier G is preferably driven continuously. It may be driven by any suitable connecting mechanism preferably by sprocket wheel $G^2$ on the shaft $G^{33}$ carrying gear $G^4$ meshing with gear $G^5$ on the shaft $G^6$ carrying sprocket wheel $G^7$ and chain $G^8$ connecting with the sprocket wheel $G^9$ on the shaft $P^4$. The shaft $P^4$ is preferably driven by the shaft 54 having gear 67 meshing with gear 68 on shaft 69, having sprocket wheel 70 and chain 71 which engages sprocket wheel 72 on shaft $P^4$.

The solder applying and sweating roller H is preferably continuously rotated. It may be driven by any suitable connecting mechanism, preferably by sprocket wheel $P^2$ connecting through chain $P^1$ with sprocket $P^3$ on the shaft $P^4$.

T is the wiper arranged in the path of the can bodies as they are conveyed along by the holders F on the carrier G. It preferably consists of a rotary brush and may be driven by any suitable connecting mechanism, preferably by bevel gear 40 on shaft $P^4$ meshing with bevel gear 41 on shaft 42, having gear 43 meshing with gear 44 on shaft 45 carrying gear 46 meshing with gear 47 on wiper shaft T.

I claim:—

1. In a lock seam can body making machine, the combination with an expansible, internal, sizing can body former horn, body formers and bumper on a stationary frame, of a solder applying device and a can body carrier having a series of opening and closing external, sizing can body holders to which the can bodies are delivered from said can body former horn, said holders forming the only means of support for the can bodies after the bodies have been received from the former horn by the holders, substantially as specified.

2. In a lock seam can body forming machine, the combination with a body former horn, body formers and seam bumper on a stationary frame, said horn being provided with a short extension for supporting a can body as it is discharged from the horn, a can body carrier, and a plurality of opening and closing can body holders on said carrier, said holders forming the only means of support for the can bodies after the bodies have been received from the former horn by the holders, substantially as specified.

3. In a lock seam can body forming machine, the combination with a body former horn, body formers and seam bumper on a stationary frame, said horn being provided with a short extension for supporting a can body as it is discharged from the horn, a can body carrier, and a plurality of opening and closing can body holders on said carrier, said holders forming the only means of support for the can bodies after the bodies have been received from the former horn by the holders, and a soldering device, substantially as specified.

4. In a lock seam can body forming machine, the combination with a body former horn, body formers and seam bumper on a stationary frame, said horn being provided with a short extension for supporting a can body as it is discharged from the horn, a can body carrier, and a plurality of opening and closing can body holders on said carrier, said holders forming the only means of support for the can bodies after the bodies have been received from the former horn by the holders, a soldering device and a fluxing device, substantially as specified.

5. In a can body making machine, the combination with an internal, sizing can body former horn and non-traveling body formers and bumper, of an externally sizing traveling can body holder forming the only means of support for the can body after the latter is received from the body forming mechanism, and a soldering device cooperating with said holder, substantially as specified.

6. In a can body machine, the combination with a can body former horn having an extension for supporting a can body and non-traveling body formers and bumper, of a carrier having a plurality of opening and closing externally clamping can body holders, said holders forming the only means of support for the can bodies after the bodies have been received from the former horn by the holders, substantially as specified.

7. In a can body machine, the combination with a can body former horn having an extension for supporting a can body and non-traveling body formers and bumper, of a carrier having a plurality of opening and closing externally clamping can body holders, said holders forming the only means of support for the can bodies after the bodies have been received from the former horn by the holders, and a soldering device, substantially as specified.

8. In a can body machine, the combination with a can body former horn having an extension for supporting a can body and non-traveling body formers and bumper, of a carrier having a plurality of opening and closing externally clamping can body holders, said holders forming the only means of support for the can bodies after the bodies have been received from the former horn by the holders, a molten solder vessel, and a solder applying roller, substantially as specified.

9. In a can body machine, the combination with a can body former horn having an extension for supporting a can body and non-traveling body formers and bumper, of a carrier having a plurality of opening and closing externally clamping can body holders, said holders forming the only means of support for the can bodies after the bodies have been received from the former horn by the holders, and a fluxing device, substantially as specified.

10. In a can body machine, the combination with a can body former horn having an extension for supporting a can body and non-traveling body formers and bumper, of a carrier having a plurality of opening and closing externally clamping can body holders, said holders forming the only means of support for the can bodies after the bodies have been received from the former horn by the holders, a fluxing device, and a soldering device, substantially as specified.

11. In a can body machine, the combination with a can body former horn having an extension for supporting a can body and non-traveling body formers and bumper, of a carrier having a plurality of opening and closing externally clamping can body holders, said holders forming the only means of support for the can bodies after the bodies have been received from the former horn by the holders, a rotary flux applying disk, and a rotary longitudinally arranged solder applying roller and means for supplying molten solder to the surface of said roller, substantially as specified.

12. In a can body machine, the combination with a can body former horn having an extension for supporting a can body and non-traveling body formers and bumper, of a carrier having a plurality of opening and closing externally clamping can body holders, said holders forming the only means of support for the can bodies after the bodies have been received from the former horn by the holders, and a stationary supporting track for said carrier, substantially as specified.

13. In a can body machine, the combination with a can body former horn having an extension for supporting a can body and non-traveling body formers and bumper, of a carrier having a plurality of opening and closing externally clamping can body holders, said holders forming the only means of support for the can bodies after the bodies have been received from the former horn by the holders, and guide rails for holding said can body holders closed, substantially as specified.

14. In a can body machine, the combination with a can body former horn having an extension for supporting a can body and non-traveling body formers and bumper, of a carrier having a plurality of opening and closing externally clamping can body holders, said holders forming the only means of support for the can bodies after the bodies have been received from the former horn by the holders, a stationary supporting track for said carrier, and guide rails for holding said can body holders closed, substantially as specified.

15. In a can body machine, the combination with a can body former horn having an extension for supporting a can body and non-traveling body formers and bumper, of a carrier having a plurality of opening and closing externally clamping can body holders, said holders forming the only means of support for the can bodies after the bodies have been received from the former horn by the holders, and guide rails for holding said can body holders closed, provided with cams for closing said holders, substantially as specified.

16. In a can body machine, the combination with a can body former horn having an extension for supporting a can body and non-traveling body formers and bumper, of a carrier having a plurality of opening and closing externally clamping can body holders, said holders forming the only means of support for the can bodies after the bodies have been received from the former horn by the holders, and guide rails for holding said can body holders closed, provided with cams for closing said holders and cams for opening said holders, substantially as specified.

17. In a can body machine, the combination with a can body former horn having an extension for supporting a can body and non-traveling body formers and bumper, of a carrier having a plurality of opening and closing externally clamping can body holders, said holders forming the only means of support for the can bodies after the bodies have been received from the former horn by the holders, a stationary supporting track for said carrier, and guide rails for holding said can body holders closed, provided with cams for closing said holders, substantially as specified.

18. In a can body machine, the combination with a can body former horn having an extension for supporting a can body and non-traveling body formers and bumper, of a carrier having a plurality of opening and closing externally clamping can body holders, said holders forming the only means of support for the can bodies after the bodies have been received from the former horn by the holders, a stationary supporting track for said carrier, and guide rails for holding said can body holders closed, provided with cams for closing said holders and cams for opening said holders, substantially as specified.

19. In a can body machine, the combination with a can body former horn having an extension for supporting a can body, of a carrier having a plurality of opening and closing externally clamping can body holders, said holders forming the only means of support for the can bodies after the bodies have been received from the former horn by the holders, and an ejector for discharging the can body from said former horn onto said extension, substantially as specified.

20. In a can body machine, the combination with a can body former horn having an extension for supporting a can body and non-traveling body formers and bumper, of a carrier having a plurality of opening and closing externally clamping can body holders, said holders forming the only means of support for the can bodies after the bodies have been received from the former horn by the holders, an ejector for discharging the can body from said former horn onto said extension, and a longitudinally arranged rotary solder applying roller, substantially as specified.

21. In a can body soldering machine, the combination with means for guiding unsoldered formed can bodies, of an endless carrier having a series of devices thereon for externally clamping the bodies and removing them from the guiding means, the bodies being engaged on the exterior only while being conveyed by the devices on the endless carrier and entirely supported thereby, substantially as specified.

22. The combination with a can body carrier movable in a straight path and having a series of external clamping can body holders arranged to clamp the cans with their axes parallel to the line of movement of the carrier, of solder applying and sweating devices, the holders forming the sole means of support for the bodies during the soldering and sweating of the side seams of the bodies, substantially as specified.

23. In a can body machine, an internal supporting and guiding member for formed can bodies adjacent a carrier having a plurality of opening and closing externally clamping can body holders adapted to be closed around the bodies while on the supporting member, said holders having a path of travel in alinement with the said member, and said member terminating substantially at the end of said path nearest the member, substantially as specified.

24. The combination with a can body endless chain carrier having a series of external pivoted clamping can body holders arranged to clamp the cans with their axes parallel to the line of movement of the carrier, of a rotary solder applying and sweating device, the holders forming the sole means of support for the bodies during the soldering and sweating of the side seams of the bodies, substantially as specified.

25. In a can body machine, an internal supporting and guiding member for formed can bodies adjacent an endless carrier having a series of opening and closing externally clamping can body holders adapted to be closed around the bodies while on the supporting member, said holders having one portion of their path of travel in a straight line, and a longitudinally arranged rotary solder applying roller adjacent said straight portion of the path of the carrier, said supporting member terminating at a point spaced from the nearest end of the roller, substantially as specified.

26. In a can body machine, an internal supporting and guiding member for formed can bodies adjacent an endless carrier having a series of opening and closing externally clamping can body holders adapted to be closed around the bodies while on the supporting member, said holders having one portion of their path of travel in a straight line, and a longitudinally arranged rotary solder applying roller adjacent said straight portion of the path of the carrier, said supporting member terminating at a point spaced from the nearest end of the roller, and a molten solder vessel in which said roller rotates, substantially as specified.

27. In a machine of the character described, in combination: an internal can body support adapted to receive and support can bodies as they come from a can body forming mechanism; a can body carrier having a series of opening and closing externally clamping can body holders coöperating to take the can bodies one by one from said support; and a soldering device, said soldering device being located near one end of said support, substantially as specified.

28. In a machine of the character described, in combination: an internal can body support adapted to receive and support can bodies as they are delivered from a can body forming mechanism; a can body carrier having a series of opening and closing externally clamping can body holders coöperating to take the can bodies one by one from said support and forming the sole means for supporting the can bodies after they have been taken from said can body support; and a fluxing device, substantially as specified.

29. In a machine of the character described, in combination: an internal can body support adapted to receive and support formed can bodies as they are delivered from a can body forming mechanism; a can body carrier having a series of opening and closing, externally clamping can body holders coöperating to take the can bodies one by one from said support; a fluxing device; and a soldering device, the soldering device terminating at one end at a point spaced from one end of said internal can body support, substantially as specified.

30. In a machine of the character described, in combination: an internal can body support adapted to receive and support formed can bodies as they are deilvered from a can body forming mechanism; a can body carrier having a series of opening and closing, externally clamping can body holders coöperating to take the can bodies one by one from said support; and a longitudinally arranged, rotatable, solder applying roller, substantially as specified.

31. The combination with a body former horn and non-traveling means for forming a lock seam can body around said horn, of an internal can body support to which the can bodies are delivered from said horn, a can body carrier having a series of opening and closing externally clamping can body holders coöperating to take the can bodies one by one from said support, a longitudinally arranged solder applying roller, and a molten solder vessel in which said roller rotates, substantially as specified.

32. In a can body making machine, the combination with a stationary internal, sizing can body former horn and non-traveling means for forming a lock seam can body around said horn, of a series of opening and closing external, sizing and clamping can body holders, and a carrier upon which said holders are mounted, substantially as specified.

33. In a can body making machine, the combination with a stationary internal, sizing can body former horn, of a series of opening and closing external, sizing and clamping can body holders, a carrier upon which said holders are mounted, and means for delivering the can bodies one by one from said horn to said holders, substantially as specified.

34. In a can body making machine, the combination with a stationary internal, sizing can body former horn and non-traveling means for forming a lock seam can body around said horn, of a series of opening and closing external, sizing and clamping can body holders, a carrier upon which said holders are mounted, and a soldering device, substantially as specified.

35. In a can body making machine, the combination with a stationary internal, sizing can body former horn, of a series of opening and closing external, sizing and clamping can body holders, a carrier upon which said holders are mounted, means for delivering the can bodies one by one from said horn to said holders, and a soldering device, substantially as specified.

36. In a can body making machine, the combination with a stationary internal, sizing can body former horn, of a series of opening and closing external, sizing and clamping can body holders, a carrier upon which said holders are mounted, and means for delivering the can bodies one by one from said horn to said holders, and a solder applying roller, substantially as specified.

37. In a can body making machine, the combination with a stationary internal, sizing can body former horn, of a series of opening and closing internal, sizing and clamping can body holders, a carrier upon which said holders are mounted, means for delivering the can bodies one by one from said horn to said holders, a solder applying roller and a fluxing device, substantially as specified.

38. In a can body making machine, the combination with a stationary internal, sizing can body former horn and non-traveling means for forming a lock seam can body around said horn, of a series of opening and closing external, sizing and clamping can body holders, a carrier upon which said holders are mounted, and means for automatically opening and closing said holders, substantially as specified.

39. In a can body making machine, the combination with a stationary internal, sizing can body former horn and non-traveling means for forming a lock seam can body around said horn, of a series of opening and closing external, sizing and clamping can body holders, a carrier upon which said holders are mounted, means for automatically opening and closing said holders, and holding them closed, substantially as specified.

40. In a can body making machine, the combination with a stationary internal, sizing can body former horn, of a series of opening and closing external, sizing and clamping can body holders, a carrier upon which said holders are mounted, means for delivering the can bodies one by one from said horn to said holders, and means for automatically opening and closing said holders, substantially as specified.

41. In a can body making machine, the combination with a stationary internal, sizing can body former horn, of a series of opening and closing external, sizing and clamping can body holders, a carrier upon which said holders are mounted, means for delivering the can bodies one by one from said horn to said holders, means for automatically opening and closing said holders, and a solder applying roller, substantially as specified.

42. In a can body making machine, the combination with a stationary internal, sizing can body former horn, of a series of opening and closing external, sizing and clamping can body holders, a carrier upon which said holders are mounted, means for delivering the can bodies one by one from said horn to said holders, means for automatically opening and closing said holders, a solder applying roller, and a molten solder vessel in which said roller is partially immersed, substantially as specified.

43. In a can body machine, the combination with a body blank conveyer, of a body forming mechanism including a former horn and a seam squeezer or bumper, said body former horn having a can body supporting extension, a can body ejector, and a can body carrier having a series of opening and closing external, clamping and sizing can body holders, substantially as specified.

44. In a can body machine, the combination with a body blank conveyer, of a body forming mechanism including a former horn and a seam squeezer or bumper, said body former horn having a can body supporting extension, a can body ejector, and a can body carrier having a series of opening and closing external, clamping and sizing can body holders, a molten solder vessel and a solder applying and sweating roller, substantially as specified.

45. In a can body machine, the combination with a body blank conveyer, of a body forming mechanism including a former horn and a seam squeezer or bumper, said body former horn having a can body supporting extension, a can body ejector, and a can body carrier having a series of opening and closing external, clamping and sizing can body holders, a molten solder vessel and a solder applying and sweating roller and a track for supporting said carrier, substantially as specified.

46. In a can body machine, the combination with a body blank conveyer, of a body forming mechanism including a former horn and a seam squeezer or bumper, said body former horn having a can body supporting extension, a can body ejector, a can body carrier having a series of opening and closing external, clamping and sizing can body holders, and guide tracks having cams for opening and closing said holders and holding them closed, substantially as specified.

47. In a can body machine, the combination with a body blank conveyer, of a body forming mechanism including a former horn and a seam squeezer or bumper, said body former horn having a can body supporting extension, a can body ejector, a can body carrier having a series of opening and closing external, clamping and sizing can body holders, a molten solder vessel, a solder applying and sweating roller, a track for supporting said carrier, and guide tracks having cams for opening and closing said holders and holding them closed, substantially as specified.

48. In a can body machine, the combination with a body blank conveyer, of a body forming mechanism including a former horn and a seam squeezer or bumper, said body former horn having a can body supporting extension, a can body ejector, a can body carrier having a series of opening and closing external, clamping and sizing can body holders, a molten solder vessel, a track for supporting said carrier, guide tracks having cams for opening and closing said holders and holding them closed, and a longitudinally arranged solder applying and sweating roller, substantially as specified.

49. In a can body machine, the combination with a body blank conveyer, of a body forming mechanism including a former horn and a seam squeezer or bumper, said body former horn having a can body supporting extension, a can body ejector, a can body carrier having a series of opening and closing external, clamping and sizing can body holders, a molten solder vessel, a track for supporting said carrier, guide tracks having cams for opening and closing said holders and holding them closed, a longitudinally arranged solder applying and sweating roller and a fluxing device, substantially as specified.

50. In a can body machine, the combination with a body blank conveyer, of edge folders, an expansible body former horn, body formers for wrapping the blank around said horn, a seam squeezer or bumper, said body former horn having a can body supporting extension, a can body ejector, a can body carrier having a series of opening and closing external, clamping and sizing can body holders, a molten solder vessel, a solder applying and sweating roller, and a fluxing device, substantially as specified.

51. In a machine of the class described, the combination of can body conveyer means continuously movable always in the same direction, having means for preventing the can from rotating, and a continuously rotating solder roll, said solder roll having an axially elongated soldering surface and rotatable about an axis parallel to the line of travel of the cans as the same are moved by the conveyer means, said conveyer means being adapted to convey can bodies adjacent to said solder roll whereby the side seams of said can bodies are filled with molten solder, substantially as specified.

FRANK RUDOLPHI.

Witnesses:
EDMUND ADCOCK,
H. M. MUNDAY.

---

Corrections in Letters Patent No. 1,082,557.

It is hereby certified that in Letters Patent No. 1,082,557, granted December 30, 1913, upon the application of Frank Rudolphi, of Chicago, Illinois, for an improvement in "Can-Body-Making Machines," errors appear in the printed specification requiring correction as follows: Page 1, line 22, before the word "body" insert the words *of the;* same page and line after the word "body" strike out the words "of the"; page 7, line 36, for the word "internal" read *external;* page 8, lines 54–57, strike out the words "edge folders, an expansible body former horn, body formers for wrapping the blank around said horn," and insert the words *a body forming mechanism including a former horn and;* and that the said Letters Patent should be read with these corrections therein that the same may conform to the record of the case in the Patent Office.

Signed and sealed this 5th day of May, A. D., 1914.

[SEAL.]

J. T. NEWTON,
*Acting Commissioner of Patents.* forming mechanism including a former horn and a seam squeezer or bumper, said body former horn having a can body supporting extension, a can body ejector, a can body carrier having a series of opening and closing external, clamping and sizing can body holders, and guide tracks having cams for opening and closing said holders and holding them closed, substantially as specified.

47. In a can body machine, the combination with a body blank conveyer, of a body forming mechanism including a former horn and a seam squeezer or bumper, said body former horn having a can body supporting extension, a can body ejector, a can body carrier having a series of opening and closing external, clamping and sizing can body holders, a molten solder vessel, a solder applying and sweating roller, a track for supporting said carrier, and guide tracks having cams for opening and closing said holders and holding them closed, substantially as specified.

48. In a can body machine, the combination with a body blank conveyer, of a body forming mechanism including a former horn and a seam squeezer or bumper, said body former horn having a can body supporting extension, a can body ejector, a can body carrier having a series of opening and closing external, clamping and sizing can body holders, a molten solder vessel, a track for supporting said carrier, guide tracks having cams for opening and closing said holders and holding them closed, and a longitudinally arranged solder applying and sweating roller, substantially as specified.

49. In a can body machine, the combination with a body blank conveyer, of a body forming mechanism including a former horn and a seam squeezer or bumper, said body former horn having a can body supporting extension, a can body ejector, a can body carrier having a series of opening and closing external, clamping and sizing can body holders, a molten solder vessel, a track for supporting said carrier, guide tracks having cams for opening and closing said holders and holding them closed, a longitudinally arranged solder applying and sweating roller and a fluxing device, substantially as specified.

50. In a can body machine, the combination with a body blank conveyer, of edge folders, an expansible body former horn, body formers for wrapping the blank around said horn, a seam squeezer or bumper, said body former horn having a can body supporting extension, a can body ejector, a can body carrier having a series of opening and closing external, clamping and sizing can body holders, a molten solder vessel, a solder applying and sweating roller, and a fluxing device, substantially as specified.

51. In a machine of the class described, the combination of can body conveyer means continuously movable always in the same direction, having means for preventing the can from rotating, and a continuously rotating solder roll, said solder roll having an axially elongated soldering surface and rotatable about an axis parallel to the line of travel of the cans as the same are moved by the conveyer means, said conveyer means being adapted to convey can bodies adjacent to said solder roll whereby the side seams of said can bodies are filled with molten solder, substantially as specified.

FRANK RUDOLPHI.

Witnesses:
EDMUND ADCOCK,
H. M. MUNDAY.

---

Corrections in Letters Patent No. 1,082,557.

It is hereby certified that in Letters Patent No. 1,082,557, granted December 30, 1913, upon the application of Frank Rudolphi, of Chicago, Illinois, for an improvement in "Can-Body-Making Machines," errors appear in the printed specification requiring correction as follows: Page 1, line 22, before the word "body" insert the words *of the;* same page and line after the word "body" strike out the words "of the"; page 7, line 36, for the word "internal" read *external;* page 8, lines 54–57, strike out the words "edge folders, an expansible body former horn, body formers for wrapping the blank around said horn," and insert the words *a body forming mechanism including a former horn and;* and that the said Letters Patent should be read with these corrections therein that the same may conform to the record of the case in the Patent Office.

Signed and sealed this 5th day of May, A. D., 1914.

[SEAL.]

J. T. NEWTON,
*Acting Commissioner of Patents.*

It is hereby certified that in Letters Patent No. 1,082,557, granted December 30, 1913, upon the application of Frank Rudolphi, of Chicago, Illinois, for an improvement in "Can-Body-Making Machines," errors appear in the printed specification requiring correction as follows: Page 1, line 22, before the word "body" insert the words *of the;* same page and line after the word "body" strike out the words "of the"; page 7, line 36, for the word "internal" read *external;* page 8, lines 54–57, strike out the words "edge folders, an expansible body former horn, body formers for wrapping the blank around said horn," and insert the words *a body forming mechanism including a former horn and;* and that the said Letters Patent should be read with these corrections therein that the same may conform to the record of the case in the Patent Office.

Signed and sealed this 5th day of May, A. D., 1914.

[SEAL.]

J. T. NEWTON,
*Acting Commissioner of Patents.*